(12) United States Patent
Kinoshita (10) Patent No.: US 11,046,621 B2
(45) Date of Patent: Jun. 29, 2021

(54) HONEYCOMB STRUCTURE

(71) Applicant: NGK Insulators, Ltd., Nagoya (JP)

(72) Inventor: Takashi Kinoshita, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 293 days.

(21) Appl. No.: 16/357,908

(22) Filed: Mar. 19, 2019

(65) Prior Publication Data

US 2019/0300443 A1    Oct. 3, 2019

(30) Foreign Application Priority Data

Mar. 27, 2018 (JP) .............................. JP2018-060205

(51) Int. Cl.
| | | |
|---|---|---|
| *C04B 38/00* | (2006.01) | |
| *B01D 46/24* | (2006.01) | |
| *B01J 35/04* | (2006.01) | |
| *B01D 53/94* | (2006.01) | |

(52) U.S. Cl.
CPC ........ *C04B 38/0006* (2013.01); *B01D 46/247* (2013.01); *B01D 53/9454* (2013.01); *B01J 35/04* (2013.01); *B01D 2046/2481* (2013.01); *B01D 2279/30* (2013.01)

(58) Field of Classification Search
None
See application file for complete search history.

(56) References Cited

U.S. PATENT DOCUMENTS

| | | | |
|---|---|---|---|
| 2002/0042344 A1 | 4/2002 | Kondo et al. | |
| 2014/0287192 A1* | 9/2014 | Murata | ................. F01N 3/2828 428/117 |
| 2015/0004353 A1 | 1/2015 | Hayashi et al. | |
| 2015/0275726 A1 | 10/2015 | Tamai et al. | |

FOREIGN PATENT DOCUMENTS

| | | |
|---|---|---|
| DE | 11 2013 000 714 T5 | 11/2014 |
| GB | 2 342 055 A | 4/2000 |
| JP | 2000-097019 A1 | 4/2000 |
| JP | 2002-177794 A1 | 6/2002 |
| JP | 2008-018370 A1 | 1/2008 |
| JP | 2015-192988 A1 | 11/2015 |

OTHER PUBLICATIONS

German Search Report (Application No. 10 2019 204 268.6) dated Oct. 21, 2020 (with English translation).

* cited by examiner

*Primary Examiner* — David Sample
*Assistant Examiner* — Elizabeth Collister
(74) *Attorney, Agent, or Firm* — Burr & Brown, PLLC (57) ABSTRACT

The honeycomb structure is equipped with a pillar-shaped honeycomb structure body having a porous partition wall that defines a plurality of cells extending from an inflow end face to an outflow end face and serving as a through channel of a fluid and a circumferential wall placed to surround the circumference of the partition wall. The honeycomb structure body has, in a face orthogonal to an extending direction of the cells of the honeycomb structure body, a circumferential cell structure, a center cell structure, and a boundary wall placed at a boundary between the circumferential cell structure and the center cell structure and incomplete cells of 5% or more to 50% or less of the total number of the incomplete cells of the center cell structure is communicated with incomplete cells of the circumferential cell structure with each other.

6 Claims, 5 Drawing Sheets

HONEYCOMB STRUCTURE

The present application is an application based on JP 2018-060205 filed on May 27, 2018 with Japan Patent Office, the entire contents of which are incorporated herein by reference.

BACKGROUND OF THE INVENTION

Field of the Invention

The present invention relates to a honeycomb structure. More specifically, it pertains to a honeycomb structure having two or more cell structures separated from one another by a boundary wall, capable of relaxing stress concentration generated in the vicinity of the boundary wall, and having excellent thermal shock resistance.

Description of the Related Art

To remove harmful substances such as HC, CO, and $NO_x$ from an exhaust gas emitted from the engine of automobiles or the like and thereby purify the exhaust gas, a honeycomb structure having a catalyst loaded thereon has been used conventionally. The honeycomb structure has also been used as a filter for purifying an exhaust gas by plugging an open end of cells defined by a porous partition wall.

The honeycomb structure is a pillar-shaped structure having a partition wall for defining a plurality of cells serving as a through channel of an exhaust gas. In such a honeycomb structure, a plurality of cells has, in a face orthogonal to an extending direction of the cell, a cell structure in which the cells are arranged regularly at a predetermined cycle. Conventionally, one honeycomb structure has one cell structure in the face. Recently, on the other hand, a honeycomb structure having, in the face thereof, two or more cell structures is proposed with a view to improving an exhaust gas purification efficiency or the like. For example, there is proposed a honeycomb structure having, in the face thereof, two or more cell structures obtained by making the center portion and the circumferential portion, in the face orthogonal to the extending direction of the cell, different from each other in cell density or cell shape (refer to, for example, Patent Documents 1 to 3).

For example, Patent Documents 1 to 3 disclose, as the honeycomb structure having two or more cell structures, a honeycomb structure constituted, in the face thereof orthogonal to the extending direction of the cell, to have a high cell density at the center portion and a low cell density at the circumferential portion. Thus, a honeycomb structure having two or more cell structures different in cell density between the center portion and the circumferential portion of the honeycomb structure has conventionally been proposed.

Also proposed, as the honeycomb structure having two or more cell structures, a honeycomb structure having a plurality of cell density regions different in cell density (refer to, for example, Patent Document 4). In the honeycomb structure described in Patent Document 4, two cell density regions adjacent to each other have therebetween a cylindrical boundary wall for separating them from each other. The honeycomb structure described in Patent Document 4 is characterized by that the inscribed circle of a boundary cell inscribing the boundary wall has a diameter of 0.5 mm or more.

[Patent Document 1] JP-A-2002-177794
[Patent Document 2] JP-A-2008-018370
[Patent Document 3] JP-A-2000-097019
[Patent Document 4] JP-A-2015-192988

SUMMARY OF THE INVENTION

A honeycomb structure having a cylindrical boundary wall at the boundary between different cell structures, as the honeycomb structure described in Patent Document 4, has such a drawback as poor thermal shock resistance because stress concentration is likely to occur in the vicinity of the boundary wall at which the cell structure changes.

The present invention has been made with a view to overcoming such a problem of the conventional art. An object of the invention is to provide a honeycomb structure having two or more cell structures separated from one another by a boundary wall, capable of relaxing stress concentration generated in the vicinity of the boundary wall, and having excellent thermal shock resistance.

According to the present invention, a honeycomb structure shown below is provided.

(1) A honeycomb structure equipped with a pillar-shaped honeycomb structure body having a porous partition wall that defines a plurality of cells extending from an inflow end face to an outflow end face and serving as a through channel of a fluid and a circumferential wall disposed to surround therewith a circumference of the partition wall, wherein:

supposing that in a face orthogonal to an extending direction of the cells of the honeycomb structure body, cells which are the above-described and partitioned at all the sides thereof by the partition wall are designated as complete cells;

the honeycomb structure body has, in the face orthogonal to an extending direction of the cells of the honeycomb structure body, a circumferential cell structure, a center cell structure, and a boundary wall disposed at a boundary between the circumferential cell structure and the center cell structure;

the circumferential cell structure includes, as a repeating unit, the complete cells formed in a circumferential portion of the honeycomb structure body;

the center cell structure includes, as a repeating unit, the complete cells formed in a center portion of the honeycomb structure body;

the circumferential cell structure has, at a boundary portion with the center cell structure, incomplete cells including a portion of a shape of the complete cells serving as the repeating unit of the circumferential cell structure;

the center cell structure has, at a boundary portion with the circumferential cell structure, incomplete cells including a portion of a shape of the complete cells serving as the repeating unit of the center cell structure; and the incomplete cells of 5% or more to 50% or less of the total number of the incomplete cells of the center cell structure are communicated with the incomplete cells of the circumferential cell structure with each other.

(2) The honeycomb structure according to (1), wherein in the face orthogonal to an extending direction of the cells of the honeycomb structure body, the repeating unit of the circumferential cell structure and the repeating unit of the center cell structure are different from each other in shape.

(3) The honeycomb structure according to (1) or (2), wherein in the face orthogonal to an extending direction of the cells of the honeycomb structure body, the incomplete cells of the center cell structure are partitioned from the incomplete cells of the circumferential cell structure by the partition wall which runs continuously.

(4) The honeycomb structure according to any one of (1) to (3), wherein at a position where the incomplete cells of the center cell structure are communicated with the incomplete cells of the circumferential cell structure, one of the incomplete cells of the circumferential cell structure is communicated with one of the incomplete cells of the center cell structure.

(5) The honeycomb structure according to any one of (1) to (3), wherein the incomplete cells of the center cell structure communicated with the incomplete cells of the circumferential cell structure are not present adjacently in the circumferential direction of the boundary portion.

(6) The honeycomb structure according to any one of (1) to (5), wherein in the face orthogonal to an extending direction of the cells of the honeycomb structure body, an arranging direction of the cells as a repeating unit in the center cell structure has an inclination angle of 10° or more to 50° or less with respect to an arranging direction of the cells as a repeating unit in the circumferential cell structure.

The honeycomb structure of the present invention having two or more cell structures separated from one another by a boundary wall is capable of relaxing stress concentration generated in the vicinity of the boundary wall, and having excellent thermal shock resistance. The honeycomb structure of the present invention can therefore effectively reduce breakage at the boundary wall and in the vicinity thereof when a stress is generated.

DESCRIPTION OF THE PREFERRED EMBODIMENTS

Hereinafter, embodiments of the present invention will be described, but the present invention is not limited to the following embodiments. Therefore, it should be understood that the following embodiments will be changed, improved, or the like as needed based on the ordinary knowledge of those skilled in the art without departing from the gist of the present invention.

(1) Honeycomb Structure:

As shown in FIGS. 1 to 5, one embodiment of the honeycomb structure according to the present invention is a honeycomb structure 100 equipped with a pillar-shaped honeycomb structure body 4. The honeycomb structure body 4 has a porous partition wall 1 and a circumferential wall 3 disposed to surround the circumference of the partition wall 1. The partition wall 1 of the honeycomb structure body 4 defines a plurality of cells 2 extending from an inflow end face 11 to an outflow end face 12 and serving as a through channel of a fluid.

Figure 1:
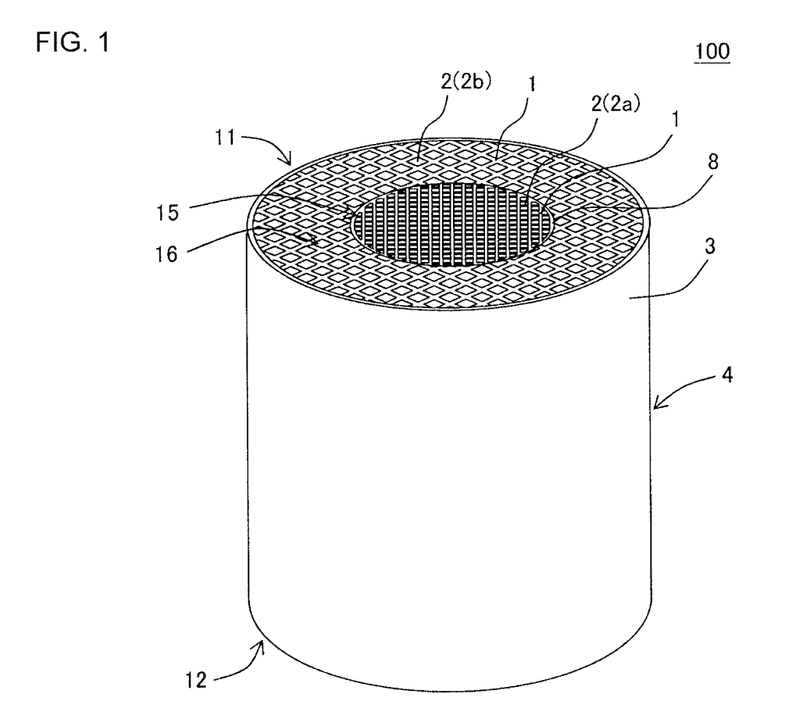
FIG. 1 is a perspective view schematically showing one embodiment of a honeycomb structure of the present invention.
Figure 2:
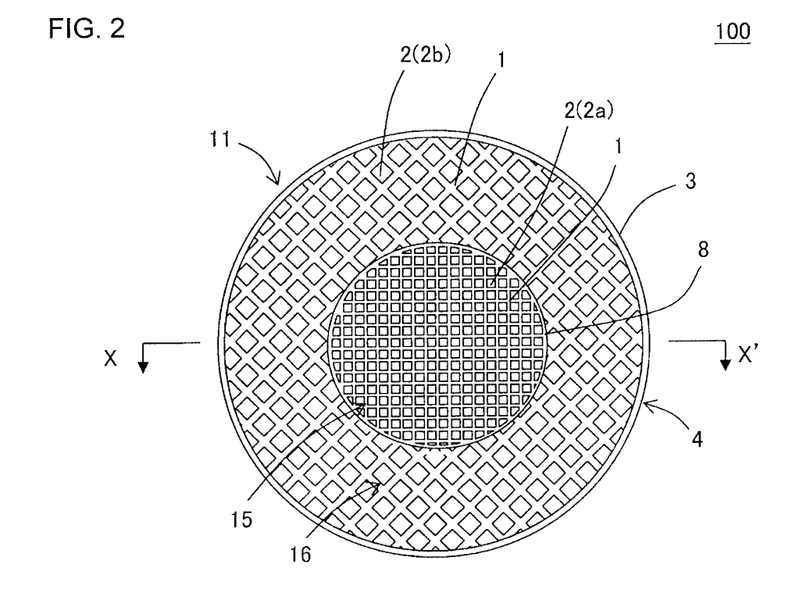
FIG. 2 is a plan view schematically showing an inflow end face of the honeycomb structure shown in FIG. 1.
Figure 3:
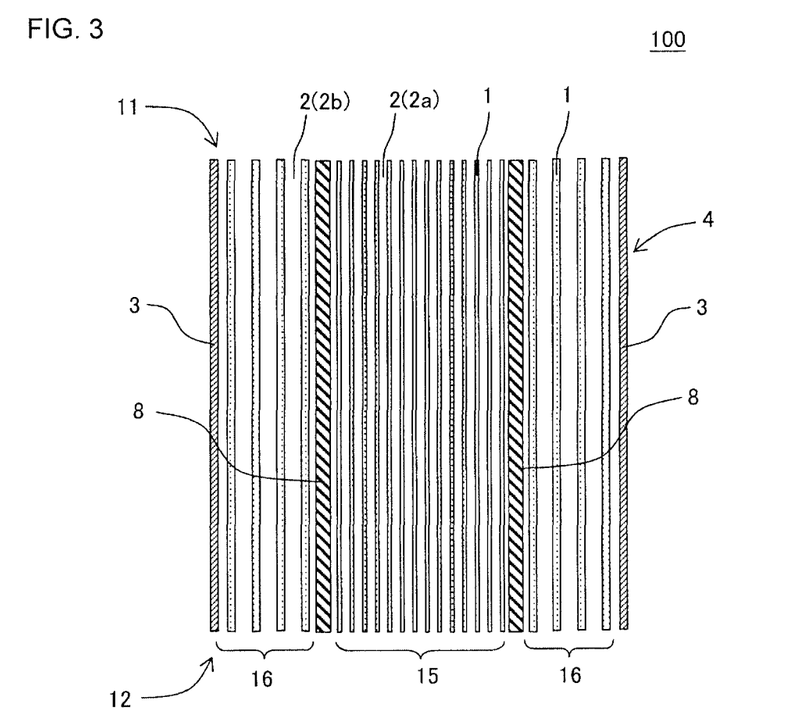
FIG. 3 is a cross-sectional view schematically showing a cross-section taken along the line X-X' of FIG. 2.
Figure 4:
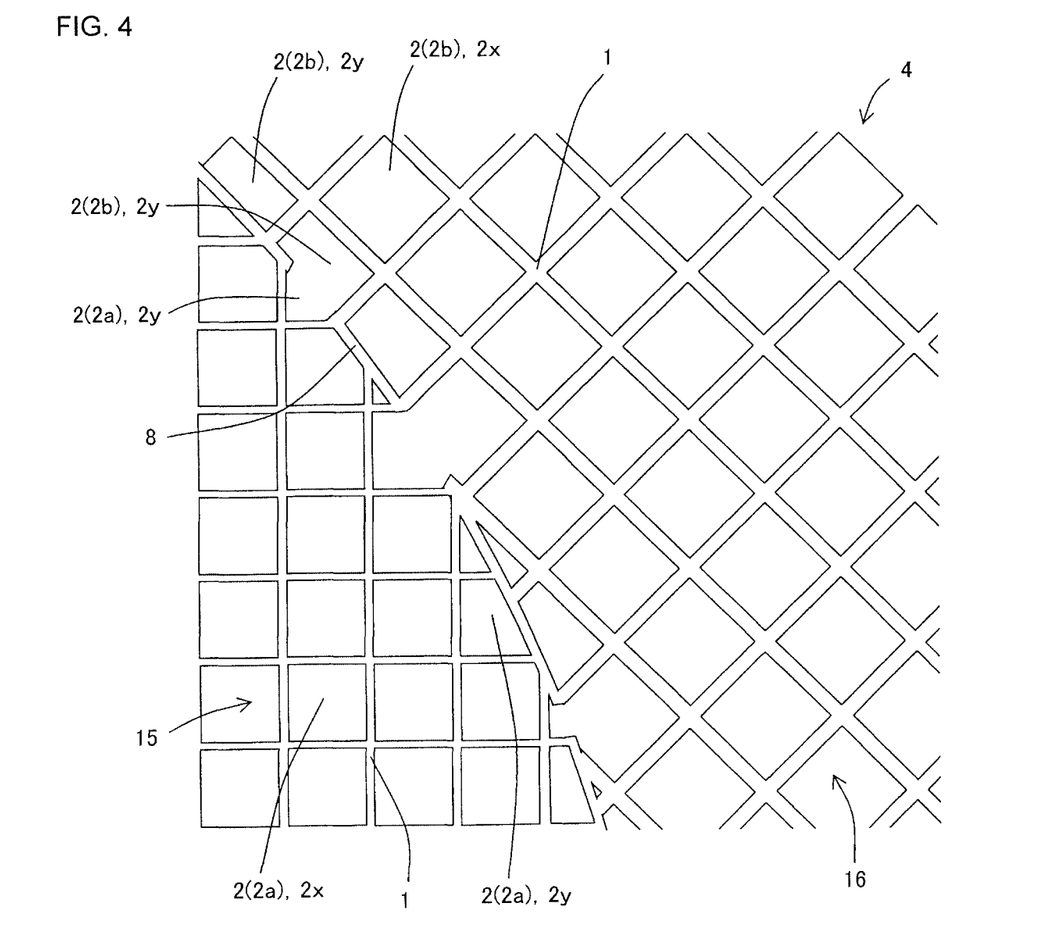
FIG. 4 is an enlarged plan view schematically showing a portion of the inflow end face of the honeycomb structure shown in FIG. 2.
Figure 5:
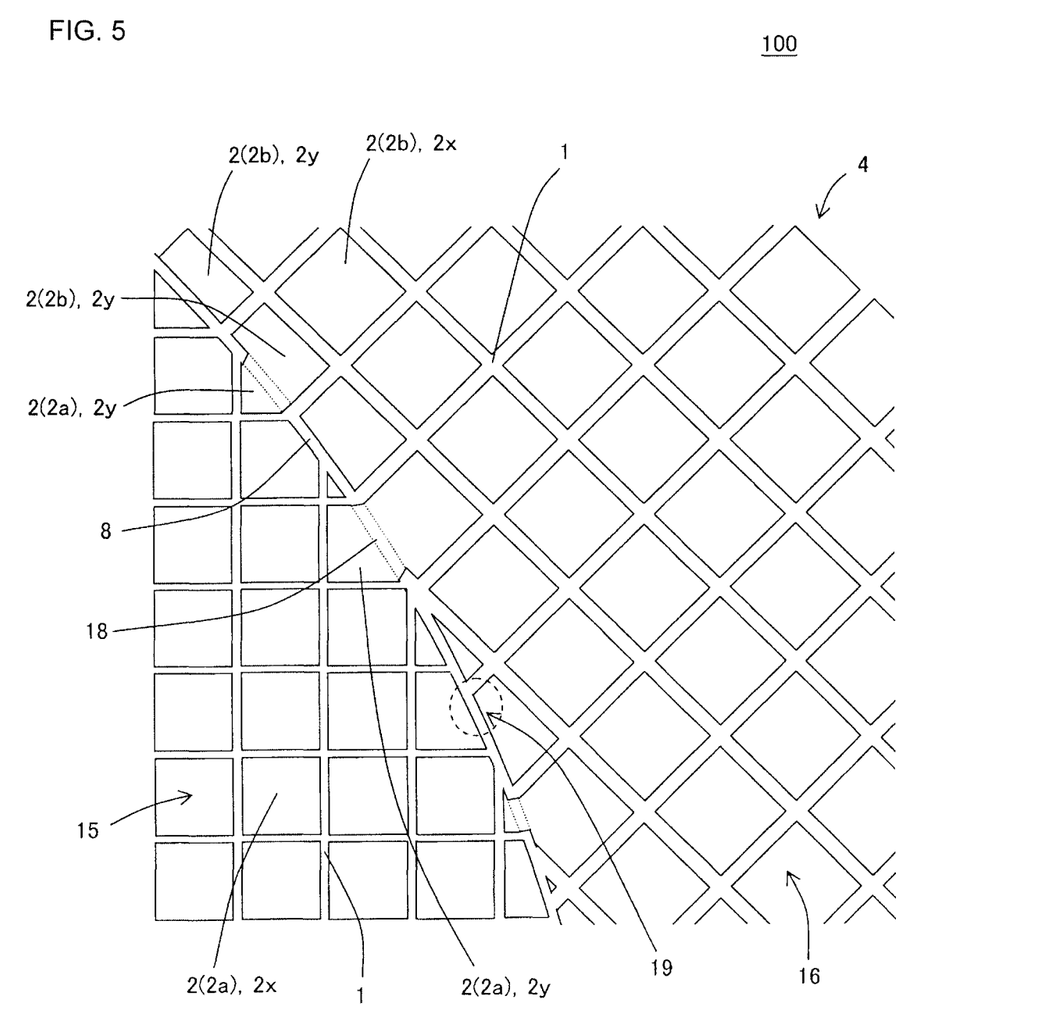
FIG. 5 is a schematic view for describing the enlarged plan view shown in FIG. 4.

FIG. 1 is a perspective view schematically showing the one embodiment of the honeycomb structure of the present invention. FIG. 2 is a plan view schematically showing an inflow end face of the honeycomb structure shown in FIG. 1. FIG. 3 is a cross-sectional view schematically showing a cross-section taken along the line X-X' of FIG. 2. FIG. 4 is an enlarged plan view schematically showing a portion of the inflow end face of the honeycomb structure body shown in FIG. 2. FIG. 5 is a schematic view for describing the enlarged plan view shown in FIG. 4.

The honeycomb structure 100 of the present embodiment is characterized by that the honeycomb structure body 4 has the following constitution. The honeycomb structure body 4 has a center cell structure 15, a circumferential cell structure 16, and a boundary wall 8 disposed at the boundary portion between the circumferential cell structure 16 and the center cell structure 15. Here, in the cross-section orthogonal to an extending direction of the cells 2 of the honeycomb structure body 4, cells 2 which are the plurality of cells 2 and partitioned at all the sides thereof by the partition wall 1 are designated as complete cell $2x$. This complete cell $2x$ becomes a repeating unit (in other words, a base unit) in each of the above-described center cell structure 15 and the circumferential cell structure 16.

The "circumferential cell structure 16" is a cell structure including, in the face orthogonal to the extending direction of the cells 2 of the honeycomb structure body 4, the complete cells $2x$ formed in the circumferential portion of the honeycomb structure body 4 each as a repeating unit. The "center cell structure 15" is a cell structure including, in the above-described face, the complete cells $2x$ formed in the center portion of the honeycomb structure body 4 each as a repeating unit. The center cell structure 15 and the circumferential cell structure 16 are partitioned by the boundary wall 8 in a portion other than "incomplete cells $2y$ communicated with each other" which will be described below.

The circumferential cell structure 16 includes, at the boundary portion with the center cell structure 15, an incomplete cell $2y$ including a portion of the shape of the complete cell $2x$ serving as a repeating unit of the circumferential cell structure 16. The center cell structure 15 includes, at the boundary portion with the circumferential cell structure 16, an incomplete cell $2y$ including a portion of the shape of the complete cell $2x$ serving as a repeating unit of the center cell structure 15. The honeycomb structure 100 of the present embodiment is characterized by that 5% or more to 50% or less of the total number of the incomplete cells $2y$ of the center cell structure 15 is communicated with the incomplete cells $2y$ of the circumferential cell structure 16 with each other. Hereinafter, with respect to the incomplete cells $2y$ present at the boundary portion between the circumferential cell structure 16 and the center cell structure 15, the incomplete cells $2y$ of the center cell structure 15 may be called "center-side incomplete cell $2y$" and the incomplete cells $2y$ of the circumferential cell structure 16 may be called "circumferential-side incomplete cell $2y$".

The honeycomb structure 100 of the present embodiment, in the honeycomb structure 100 having two or more cell structures separated from each other by the boundary wall 8, can relax stress concentration generated in the vicinity of the boundary wall 8 and has excellent thermal shock resistance. That is, as described above, by adjusting the percentage of the number of the center-side incomplete cells $2y$ communicated with the circumferential-side incomplete cells $2y$ to 5% or more and 50% or less, stress concentration generated in the vicinity of the boundary wall 8 can be relaxed when the honeycomb structure 100 is generated a thermal stress. Therefore, the honeycomb structure 100 of the present embodiment can effectively prevent breakage at the boundary wall 8 and in the vicinity thereof when a thermal stress is generated.

Figure 6:
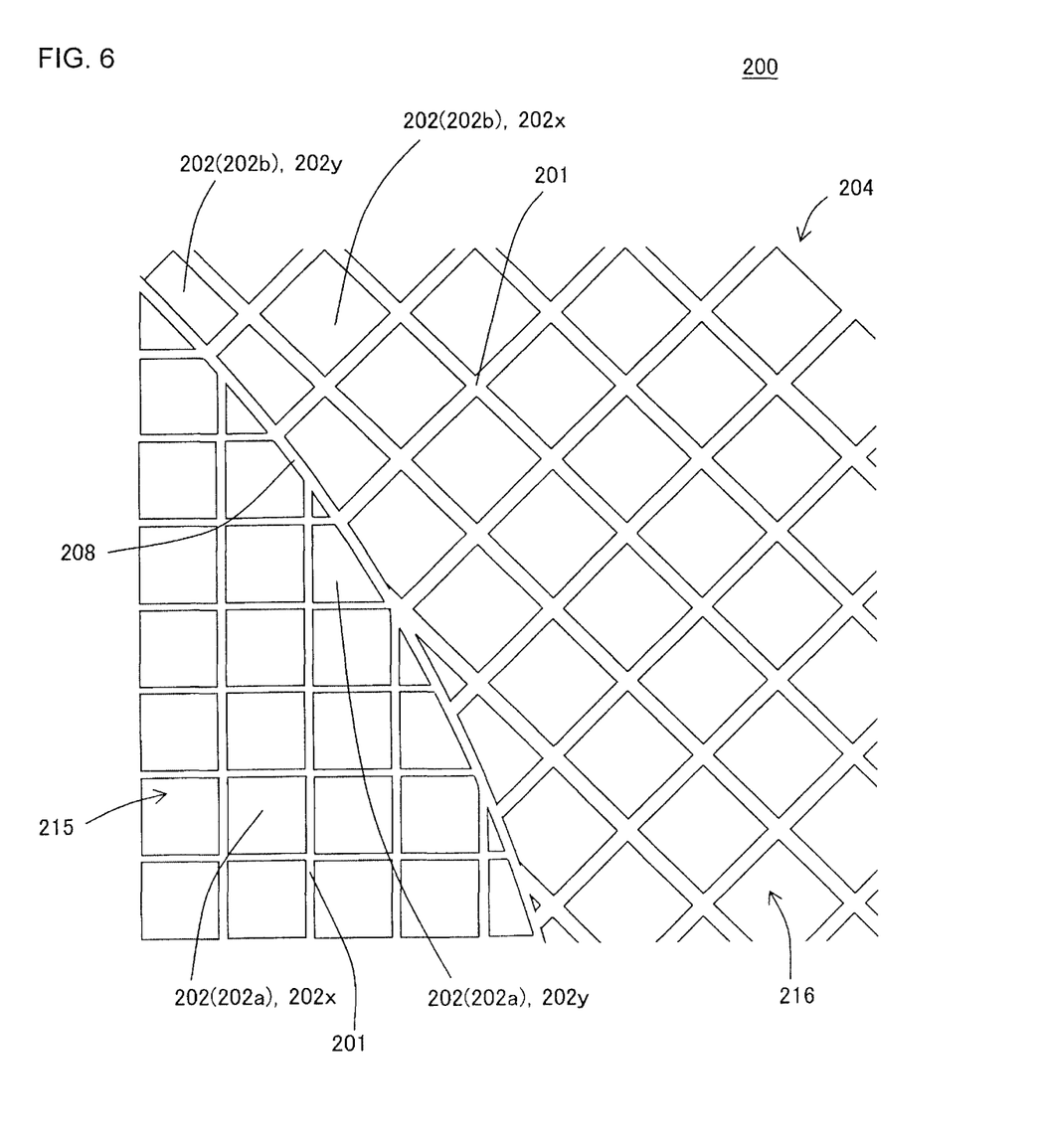
FIG. 6 is an enlarged plan view schematically showing a portion of an inflow end face of a conventional honeycomb structure.

For example, as shown in FIG. 6, in a honeycomb structure 200 equipped with a boundary wall 208 at the boundary between a circumferential cell structure 216 and a center cell structure 215, all the incomplete cells 202$y$ are usually partitioned by the boundary wall 208. In the conventional honeycomb structure 200 having such a constitution, the maximum stress when a thermal stress is generated occurs at the boundary wall 208 of the honeycomb structure body 204 and in the vicinity thereof. The conventional honeycomb structure 200 is therefore likely to have a breakage or the like by the thermal stress thus generated. FIG. 6 is an enlarged plan view schematically showing a portion of the inflow end face of the conventional honeycomb structure. In FIG. 6, a partition wall is indicated by reference numeral 201 and a cell is indicated by reference numeral 202. In addition, a cell of a center cell structure 215 is indicated by reference numeral 202$a$, a cell of a circumferential cell structure 216 is indicated by reference numeral 202$b$, and a complete cell is indicated by reference numeral 202$x$.

Compared with the conventional honeycomb structure 200 (refer to FIG. 6), the honeycomb structure 100 of the present embodiment has a structure from which a portion of the boundary wall 8 is removed as shown in FIG. 5. This means that the present invention is characterized by that the circumferential cell structure 16 and the center cell structure 15 do not have the boundary wall 8 for partitioning therebetween at a portion where the center-side incomplete cell 2$y$ is communicated with the circumferential-side incomplete cell 2$y$, enabling communication of these incomplete cells 2$y$ with each other. In FIG. 5, the boundary wall 8 of the conventional honeycomb structure was present in an area surrounded by a broken line indicated by reference numeral 18. In other words, in the honeycomb structure 100 of the present embodiment, the percentage of the number of the center-side incomplete cells 2$y$ partitioned by the boundary wall 8 from the circumferential-side incomplete cells 2$y$ is more than 50% to less than 95%.

When the percentage of the number of the center-side incomplete cells 2$y$ communicated with the circumferential-side incomplete cells 2$y$ is less than 5%, an effect of relaxing stress concentration generated in the vicinity of the boundary wall 8 is not provided sufficiently. On the other hand, when the percentage of the number of the center-side incomplete cells 2$y$ communicated with the circumferential-side incomplete cells 2$y$ is more than 50%, the resulting honeycomb structure 100 inevitably has a deteriorated mechanical strength. Hereinafter, the percentage of the number of the center-side incomplete cells 2$y$ communicated with the circumferential-side incomplete cells 2$y$ may be called "percentage of the number of communicated center-side incomplete cells 2$y$" simply.

In the honeycomb structure 100 of the present embodiment, the percentage of the number of communicated center-side incomplete cells 2$y$ is preferably 5% or more to 49% or less, particularly preferably 10% or more to 45% or less. The total number of the center-side incomplete cells 2$y$ and the number of the center-side incomplete cells 2$y$ communicated with the circumferential-side incomplete cells 2$y$ can be measured by observing the end face of the honeycomb structure 100 or the cross-section orthogonal to the extending direction of the cells 2 by an optical microscope.

In the present invention, the circumferential cell structure 16 is a cell structure including, as a repeating unit, a complete cell 2$x$ formed at the circumferential portion of the honeycomb structure body 4, particularly a complete cell 2$x$ formed at the outermost circumference. On the other hand, the center cell structure 15 is a cell structure including, as a repeating unit, a complete cell 2$x$ formed at the center portion of the honeycomb structure body 4, particularly a complete cell 2$x$ present at the center of gravity of the face orthogonal to the extending direction of the cell 2.

The term "cell structure" as used herein means a cell structure formed by the assembly of repeating units in a face orthogonal to the extending direction of the cells 2, each repeating unit being comprised of one of the cells 2 or a combination of a plurality of the cells 2 partitioned by the partition wall 1. For example, when the cells 2 have the same cell shape and are arranged regularly in the above-described face, an area having therein the cells 2 having the same cell shape becomes one cell structure. Even if the cells 2 have respectively different cell shapes, when a combination of a plurality of the cells 2 constitutes one repeating unit, an area having therein this repeating unit becomes one cell structure.

In the present invention, the "center cell structure 15" is comprised of one or more cell structures. With respect to the "center cell structure 15", when only one cell structure exists on the side inner than the circumferential cell structure 16, this one cell structure constitutes the center cell structure 15. When two or more cell structures exist on the side inner than the circumferential cell structure 16, these two or more cell structures constitute the center cell structure 15. The boundary portion between the center cell structure 15 and the circumferential cell structure 16 partially has the boundary wall 8 that partitions between the center cell structure 15 and the circumferential cell structure 16. Although not shown here, the honeycomb structure 100 of the present embodiment having the center cell structure 15 comprised of two or more cell structures may further have a second boundary wall and a third boundary wall or the like that partition these cell structures, respectively. Similarly, the circumferential cell structure 16 may be comprised of one or more cell structures and it may have a second boundary wall and a third boundary wall or the like that partition these cell structures, respectively.

In the honeycomb structure 100 of the present embodiment, the repeating unit of the circumferential cell structure 16 and the repeating unit of the center cell structure 15 are preferably different from each other in shape in the face orthogonal to the extending direction of the cells 2 of the honeycomb structure body 4. This means that the honeycomb structure 100 of the present embodiment has preferably the circumferential cell structure 16 and the center cell structure 15 having respectively different cell structures. For example, in the honeycomb structure 100 shown in FIGS. 1 to 5, the center cell structure 15 and the circumferential cell structure 16 are respectively different cell structures and the honeycomb structure body 4 is comprised of two kinds of cell structures.

Two cell structures have respectively "different cell structures" as used herein means that comparison between these two cell structures shows that they are different in any one of partition wall thickness, cell density, and cell shape. The term "different in partition wall thickness" means that when two cell structures are compared, a difference in partition wall thickness is 25 μm or more. The term "different in cell density" means that when two cell structures are compared, a difference in cell density is 7 cells/cm$^2$ or more.

In the face orthogonal to the extending direction of the cells 2 of the honeycomb structure body 4, the incomplete cell 2$y$ of the center cell structure 15 and the incomplete cell 2$y$ of the circumferential cell structure 16 are preferably partitioned by a continuous partition wall 1. The term "continuous partition wall 1" means a partition wall 1 placed to coincide with the circumferential shape of the cell 2 in the face orthogonal to the extending direction of the cell 2 of the honeycomb structure body 4. For example, when the boundary wall 8 indicated by reference numeral 19 in FIG. 5 is removed and a center-side incomplete cell 2y and a circumferential-side incomplete cell 2y are communicated with each other, two circumferential-side incomplete cells 2y adjacent to each other are communicated with one center-side incomplete cell 2y. In such a case, the partition wall 1 that partitions the two circumferential-side incomplete cells 2y adjacent to each other remains while protruding in the three incomplete cells 2y communicated with each other. The partition wall 1 protruding in incomplete cells 2y as described above is called "discontinuous partition wall 1". The honeycomb structure 100 having such a discontinuous partition wall 1 as the partition wall 1 that partitions incomplete cells 2y may have a deteriorated mechanical strength.

At a position where a center-side incomplete cell 2y of the center cell structure 15 is communicated with a circumferential-side incomplete cell 2y of the circumferential cell structure 16, communication between one center-side incomplete cell 2y and one circumferential-side incomplete cell 2y is preferred. For example, when two or more circumferential-side incomplete cells 2y are communicated with one center-side incomplete cell 2y, a partition wall 1 that partitions an incomplete cell 2y is likely to include a discontinuous partition wall 1 as described above. By constituting one center-side incomplete cell 2y to be communicated with one circumferential-side incomplete cell 2y, the resulting honeycomb structure 100 can be suppressed effectively from having a deteriorated mechanical strength.

In the face orthogonal to the extending direction of the cells 2 of the honeycomb structure body 4, center-side incomplete cells 2y each communicated with a circumferential-side incomplete cell 2y are preferably not adjacent to each other in the circumferential direction of the boundary portion. Such a constitution makes it possible to prevent the partition wall 1 that partitions incomplete cells 2y communicated with each other from having a discontinuous partition wall 1 and the resulting honeycomb structure 100 can be suppressed effectively from having a deteriorated mechanical strength.

In the case where the honeycomb structure is configured so that one circumferential-side incomplete cell 2y is communicated with one center-side incomplete cell 2y, the boundary wall 8 is preferably absent at a portion where the center-side incomplete cell 2y and the circumferential-side incomplete cell 2y are communicated with each other. In other words, in the portion where the center-side incomplete cell 2y and the circumferential-side incomplete cell 2y are communicated with each other, the boundary wall 8 of the portion where the boundary wall 8 existed in the conventional honeycomb structure as shown by a broken line indicated by a reference numeral 18 in FIG. 5, is preferably removed completely. Such a constitution makes it possible to effectively suppress the resulting honeycomb structure 100 from having a deteriorated mechanical strength.

No particular limitation is imposed on the shape of each of the cells 2 in the face orthogonal to the extending direction of the cells 2. Examples of the shape of the cells 2 constituting the center cell structure 15 and the circumferential cell structure 16 include polygons such as triangle, quadrangle, hexagon, and octagon. Although not shown in the drawings, cells constituting the center cell structure and the circumferential cell structure may be, in each cell structure, different in shape between one cell and another cell.

In the honeycomb structure of the present embodiment, the cell density of the center cell structure is preferably larger than that of the circumferential cell structure. A honeycomb structure having such a constitution is preferred from the standpoint of facilitating inflow of an exhaust gas into circumferential cells and permitting efficient contact between the honeycomb structure and the exhaust gas to achieve purification, in a face orthogonal to the extending direction of cells.

In the honeycomb structure 100 shown in FIGS. 1 to 5, an arranging direction of the repeating units of the cell 2a in the center cell structure 15 is inclined to an arranging direction of the repeating units of the cell 2b in the circumferential cell structure 16. In other words, the repeating units of the cell 2a in the center cell structure 15 are arranged in a lateral direction of the page of FIG. 2, while the repeating units of the cell 2b in the circumferential cell structure 16 are inclined relative to the lateral direction of the page of FIG. 2. Such a constitution makes it possible to suppress occurrence of stress concentration to a particular position and to produce an effect for securing strength. In the honeycomb structure 100 of the present embodiment, however, the arranging direction of the repeating units of the cell 2a in the center cell structure 15 and the arranging direction of the repeating units of the cell 2b in the circumferential cell structure 16 may be parallel to each other.

No particular limitation is imposed on an angle between the arranging direction of the repeating units of the cell 2a in the center cell structure 15 and the arranging direction of the repeating units of the cell 2b in the circumferential cell structure 16. When the arranging direction of the repeating units of the cell 2a in the center cell structure 15 is inclined relative to the arranging direction of the repeating units of the cell 2b in the circumferential cell structure 16, however, the inclination angle is preferably 10° or more to less than 50°. The above-described effect can be produced effectively by inclining the respective arranging directions of the repeating units of the cell 2a and the cell 2b within the above-described angle range.

The center cell structure has preferably a cell density of from 40 to 155 cells/cm$^2$, more preferably from 60 to 140 cells/cm$^2$, particularly preferably from 75 to 110 cells/cm$^2$. When the center cell structure has a cell density less than 40 cells/cm$^2$, the resulting honeycomb structure cannot always have sufficient strength or may have difficulty in permitting inflow of an exhaust gas into the circumferential portion. When the center cell structure has a cell density more than 155 cells/cm$^2$, the resulting honeycomb structure may have a larger pressure loss or when such a honeycomb structure has a catalyst loaded thereon, cells may be clogged with the catalyst thus loaded.

The circumferential cell structure has preferably a cell density of from 15 to 95 cells/cm$^2$, more preferably from 30 to 80 cells/cm$^2$, particularly preferably from 40 to 65 cells/cm$^2$. When the circumferential cell structure has a cell density less than 15 cells/cm$^2$, the resulting honeycomb structure cannot always have sufficient strength. When the circumferential cell structure has a cell density more than 95 cells/cm$^2$, the resulting honeycomb structure may have a larger pressure loss or when such a honeycomb structure has a catalyst loaded thereon, cells may be clogged with the catalyst thus loaded.

The thickness of the partition wall in the center cell structure is preferably from 0.05 to 0.21 mm, more preferably from 0.05 to 0.16 mm, particularly preferably from 0.05 to 0.12 mm. The center cell structure having a too thin partition wall is not preferred because the resulting honeycomb structure cannot have sufficient strength or has difficulty in permitting inflow of an exhaust gas into the circumferential portion. On the other hand, the center cell structure having a too thick partition wall is not preferred because the resulting honeycomb structure has a larger pressure loss or when such a honeycomb structure has a catalyst loaded thereon, cells may be clogged with the catalyst thus loaded.

The thickness of the partition wall in the circumferential cell structure is preferably from 0.07 to 0.23 mm, more preferably from 0.07 to 0.18 mm, particularly preferably from 0.07 to 0.15 mm. The circumferential cell structure having a too thin partition wall is not preferred because the resulting honeycomb structure cannot have sufficient strength or has difficulty in permitting inflow of an exhaust gas into the circumferential portion. On the other hand, the circumferential cell structure having a too thick partition wall is not preferred because the resulting honeycomb structure has a larger pressure loss or when such a honeycomb structure has a catalyst loaded thereon, cells may be clogged with the catalyst thus loaded.

The thickness of a circumferential wall is preferably from 0.2 to 1.0 mm, more preferably from 0.3 to 0.8 mm, particularly preferably from 0.4 to 0.6 mm. The circumferential wall having a too small thickness is not preferred because the honeycomb structure having it has a deteriorated mechanical strength as a whole. The circumferential wall having a too large thickness is not preferred, because the opening area of the cell of the honeycomb structure may decrease, leading to an increase in pressure loss.

The thickness of the boundary wall is preferably from 0.01 to 0.3 mm, more preferably from 0.05 to 0.25 mm, particularly preferably from 0.1 to 0.2 mm. The boundary wall having a too small thickness is not preferred because the honeycomb structure having it has a deteriorated mechanical strength as a whole. The boundary wall having a too large thickness is not preferred, because the opening area of the cell of the honeycomb structure may decrease, leading to an increase in pressure loss.

The partition wall of the honeycomb structure body has a porosity of preferably from 10 to 55%, more preferably from 20 to 45%, particularly preferably from 25 to 35%. The partition wall having a porosity less than 10% may lead to an increase in pressure loss when the resulting honeycomb structure is used as a filter. When the partition wall has a porosity more than 55%, the resulting honeycomb structure body has insufficient strength and during housing of the honeycomb structure in a can body to be used in an exhaust gas purification apparatus, it becomes difficult to grip the resulting honeycomb structure with sufficient holding power. The porosity of the partition wall is a value measured using a mercury porosimeter. Examples of the mercury porosimeter include "Autopore 9500" (trade name), product of Micromeritics.

As a material of the partition wall, various ceramics or metals having an oxide or a non-oxide as a main component are preferred from the standpoint of strength, heat resistance, durability, and the like. Specific examples of the ceramics include materials containing at least one selected from material groups consisting of cordierite, mullite, alumina, spinel, silicon carbide, silicon nitride, and aluminum titanate. Specific examples of the metals may include Fe—Cr—Al-based metals and metal silicon. Materials having, as a main component, one or more materials selected from the above-described materials are preferred. From the standpoint of high strength, high heat resistance, and the like, materials having, as a main component, one or more materials selected from the material group consisting of alumina, mullite, aluminum titanate, cordierite, silicon carbide, and silicon nitride are particularly preferred. From the standpoint of high thermal conductivity, high heat resistance, and the like, silicon carbide and silicon-silicon carbide composite materials are particularly preferred. The term "main component" as used herein means a component contained in a material in an amount of preferably 50 mass % or more, more preferably 70 mass % or more, particularly preferably 80 mass % or more.

The material of the boundary wall is preferably any of various ceramics, metals, and the like having an oxide or non-oxide as a main component from the standpoint of strength, heat resistance, durability, and the like. The boundary wall is preferably made of a material same as that of the partition wall.

The material of the circumferential wall is preferably any of various ceramics, metals, and the like having an oxide or non-oxide as a main component from the standpoint of strength, heat resistance, durability, and the like. The circumferential wall is preferably made of a material same as that of the partition wall. The partition wall, the boundary wall, and the circumferential wall of the honeycomb structure of the present embodiment are particularly preferably formed as a monolithic product by single extrusion.

The whole shape of the honeycomb structure is not particularly limited. With respect to the whole shape of the honeycomb structure of the present embodiment, the inflow end face and the outflow end face each have preferably a round or elliptic shape, particularly preferably a round shape. Although the size of the honeycomb structure is not particularly limited, a length from the inflow end face to the outflow end face is preferably from 50 to 254 mm. When the honeycomb structure has a round pillar shape as its whole shape, each end face has preferably a diameter of from 50 to 254 mm.

The honeycomb structure of the present embodiment can be used preferably as an exhaust gas purification member of an internal combustion engine. For example, it can be used preferably as a catalyst carrier for loading an exhaust gas purification catalyst thereon. The honeycomb structure of the present embodiment may be loaded an exhaust gas purification catalyst on at least one of the surface or pores of the partition wall of the honeycomb structure body.

The honeycomb structure of the present embodiment may be equipped further with a plugging portion placed at either end portion of a cell defined by the partition wall. This means that the plugging portion is placed at an open end of the cell on its inflow end face side or outflow end face side to plug either one end of the cell. Such a honeycomb structure can be utilized as a filter for removing a particulate matter in an exhaust gas.

(2) Method of Manufacturing Honeycomb Structure

Next, a method of manufacturing the honeycomb structure of the present invention will next be described.

First, a plastic kneaded material is prepared for manufacturing a honeycomb structure body. The kneaded material for manufacturing a honeycomb structure body can be prepared by adding an additive such as binder and water as needed to a material selected, as a raw material powder, from the above-described preferred material group of the partition wall.

Next, the resulting kneaded material is extruded into a pillar-shaped honeycomb formed body having a partition wall that defines a plurality of cells and a circumferential wall provided at the outermost circumference. In the extrusion, a die for extrusion having, at the surface thereof for extruding the kneaded material, a slit for providing an inverted shape of an intended honeycomb formed body can be used. Particularly, in manufacturing the honeycomb structure of the present invention, it is preferred to use a die for extrusion having a slit permitting communication, at a boundary portion between the center portion and the circumferential portion of a honeycomb formed body to be extruded, between the respective incomplete cells of these portions. As the above-described die, used is a die permitting communication of incomplete cells of 5% or more to 50% or less of the total number of the incomplete cells of the center cell structure with the incomplete cells of the circumferential cell structure.

The honeycomb formed body thus obtained may be dried, for example, with microwaves and hot air. A plugging portion may be placed by plugging the open end of the cell with the same material as that used for the manufacture of the honeycomb formed body.

Next, the honeycomb formed body thus obtained is fired into a honeycomb structure. A firing temperature and firing atmosphere vary depending on the raw material used. Those skilled in the art can select the firing temperature and firing atmosphere optimum for the selected material. The method of manufacturing the honeycomb structure of the present invention is however not limited to the above-described method.

EXAMPLES

A kneaded material was prepared by adding 35 parts by mass of a dispersing medium, 6 parts by mass of an organic binder, and 0.5 part by mass of a dispersing agent to 100 parts by mass of a cordierite forming raw material, followed by mixing and kneading. As the cordierite forming raw material, alumina, aluminum hydroxide, kaolin, talc, and silica were used. As the dispersing medium, water was used, as a pore former, coke having an average particle size of from 1 to 10 μm was used, as the organic binder, hydroxypropylmethyl cellulose was used, and as the dispersing agent, ethylene glycol were used.

Next, the kneaded material was extruded using a die for manufacturing a honeycomb formed body to obtain a honeycomb formed body having a round pillar shape as a whole. In extrusion, an extrusion die having a slit for forming an intended honeycomb formed body different in cell structure between the center portion and the circumferential portion was used. The die also had a slit for forming a boundary wall at a portion of the boundary between the center portion and the circumferential portion different in cell structure. The die used in Example 1 did not have a slit for forming the boundary wall for seven incomplete cells among the incomplete cells of the center cell structure. This means that the honeycomb formed body obtained by extrusion in Example 1, the seven center-side incomplete cells of the center cell structure were communicated with each other with the circumferential-side incomplete cells of the circumferential cell structure. The total number of the center-side incomplete cells is 176 and the percentage of the number of the communicated center-side incomplete cells is 4%. The seven center-side incomplete cells communicated with each other with the circumferential-side incomplete cells were arranged at random intervals in the circumferential direction of the boundary portion.

Next, the honeycomb formed body was dried with a microwave dryer, followed by complete drying with a hot air dryer. Then, the honeycomb formed body was cut at both end faces thereof into a predetermined size.

Next, the honeycomb formed body thus dried was degreased and fired to obtain a honeycomb structure of Example 1. The honeycomb structure of Example 1 had a round pillar shape and the end face of it had a diameter of 103 mm. The cells of the honeycomb structure of Example 1 had a length of 84 mm in their extending direction.

The honeycomb structure of Example 1 had a center cell structure and a circumferential cell structure different in cell structure at a face orthogonal to the extending direction of the cells. The center cell structure had a partition-wall thickness of 0.102 mm, a cell density of 62.0 cells/cm$^2$, and a quadrangular cell shape. In the honeycomb structure of Example 1, the circumferential cell structure had a partition-wall thickness of 0.076 mm, a cell density of 46.5 cells/cm$^2$, and a quadrangular cell shape.

In addition, the center cell structure of the honeycomb structure of Example 1 had a round shape at the end face of the honeycomb structure body, had a diameter of 73.4 mm, and had a boundary wall having a thickness of 0.14 mm at a portion of a boundary portion between the center cell structure and the circumferential cell structure. Seven incomplete cells of the center cell structure were communicated with each other with incomplete cells of the circumferential cell structure. Table 1 shows, in its column of "The number of communicated cells (cells)" in the "Center-side incomplete cells", the number of incomplete cells of the center cell structure communicated with each other with incomplete cells of the circumferential cell structure. Table 1 also shows, in its column of "Percentage (%) of the number of communicated cells" in the "Center-side incomplete cells", the percentage of the number of "incomplete cells communicated with each other with incomplete cells of the circumferential cell structure" with respect to the total number of incomplete cells of the center cell structure.

In the honeycomb structure of Example 1, the angle between the arranging direction of repeating units of a cell in the circumferential cell structure and the arranging direction of repeating units of a cell in the center cell structure was 45°. Table 1 shows, in its column of "Gradient of arranging direction in center cell structure" shows a value of "an angle between the arranging direction of repeating units of a cell in the circumferential cell structure and the arranging direction of repeating units of a cell in the center cell structure".

When a continuous partition wall partitions between the incomplete cells of the center cell structure and the incomplete cells of the circumferential cell structure, "Present" is written in the column of "Presence/absence of continuous partition wall". In the case where they are not partitioned by the above-described continuous partition wall, "Absent" is written in the column of "Presence/absence of continuous partition wall".

When one incomplete cell of the circumferential cell structure is communicated with one incomplete cell of the center cell structure, "Present" is written in the column of "Presence/absence of communication between incomplete cells inside and outside" of Table 1. When there is no communication site between one incomplete cell of the center cell structure and one incomplete cell of the circumferential cell structure, "Absent" is written in the column of "Presence/absence of communication between incomplete cells inside and outside" of Table 1. This means that when "Absent" is written in the above-described column, two or more incomplete cells of the circumferential cell structure are communicated with one incomplete cell of the center cell structure or one or more incomplete cells of the circumferential cell structure are communicated with two or more incomplete cells of the center cell structure.

When incomplete cells of the circumferential cell structure communicated with incomplete cells of the center cell structure are present adjacently in the circumferential direction of the boundary portion, "Present" is written in the column of "Presence/absence of incomplete cells adjacent to each other in diameter direction" of Table 1. When they are not adjacent to each other, "Absent" is written in the column of "Presence/absence of incomplete cells adjacent in diameter direction" of Table 1.

The partition wall of the honeycomb structure of Example 1 had a porosity of 35%. The porosity of the partition wall is a value measured by "Autopore 9500 (trade name)", product of Micromeritics.

The honeycomb structure of Example 1 was evaluated for its "Thermal shock resistance", "Increase of pressure loss after catalyst coating", and "mechanical strength" by the methods described below, respectively. The results are shown in Table 1.

(Thermal Shock Resistance)

The thermal shock resistance was evaluated by Electrical Spalling (ESP) test as described below. Described specifically, a honeycomb structure at room temperature is placed in an electric furnace having a furnace temperature of 400° C. and is kept in it for 20 minutes. The honeycomb structure is then taken out from the electric furnace and placed on a refractory brick. The resulting honeycomb structure is allowed to stand as is for 15 minutes or more to cool it to room temperature. Then, the state of the honeycomb structure is checked by lightly tapping the circumferential portion of the honeycomb structure with a metal rod while observing the appearance of the honeycomb structure. When no cracks are found in the honeycomb structure and a tapping sound is not dull but metallic, the honeycomb structure is considered acceptable in the evaluation at the temperature. The above-described evaluation is repeated by gradually increasing the temperature in the electric furnace by 50° C. The honeycomb structure showing no abnormality in appearance and the tapping sound at the furnace temperature elevated to 650° C. or more is considered acceptable in the evaluation. The limit temperature at which abnormality neither in appearance nor the tapping sound is found is considered as a result in the evaluation of the thermal shock resistance.

(Percentage Increase of Pressure Loss after Catalyst Coating)

A percentage increase of pressure loss after catalyst coating was evaluated by determining a percentage increase of pressure loss by the following method. First, a pressure loss of a honeycomb structure not subjected to catalyst coating is measured using a large-sized wind tunnel tester. Measurement is performed at a gas temperature of 25° C. and a gas flow rate of 10 Nm$^3$/min. After measurement of a pressure loss, 200 g/L of a catalyst (three-way catalyst) is loaded on the honeycomb structure. The term "catalyst coating" means loading of a catalyst on a honeycomb structure. A pressure loss of a honeycomb structure subjected to catalyst coating is measured under conditions similar to those for the honeycomb structure not subjected to catalyst coating. A percentage increase of pressure loss after catalyst coating is determined by the following formula (1) wherein "$P_0$" means a pressure loss of a honeycomb structure not subjected to catalyst coating and "$P_1$" means a pressure loss of a honeycomb structure subjected to catalyst coating. The honeycomb structure having a percentage increase of pressure loss after catalyst coating not more than 41% is considered acceptable.

$$\text{a percentage increase of pressure loss after catalyst coating} = (P_1 - P_0)/P_1 \times 100\% \qquad \text{Formula (1):}$$

(Mechanical Strength)

The mechanical strength was evaluated by measuring an isostatic strength shown below. Measurement of isostatic strength was performed based on an isostatic breaking strength test specified in M505-87 of Automobile Standards (JASO standards) issued by the Society of Automotive Engineers of Japan. The isostatic breaking strength test is performed by placing a honeycomb structure in a rubber cylindrical container, covering the container using an aluminum plate as a lid, and performing isostatic pressing compression in water. In other words, the isostatic breaking strength test is a simulation test of application of a compression load to a can body when a honeycomb structure is held at the circumferential surface thereof. The isostatic strength measured by this isostatic breaking strength test is represented by a value of an applied pressure (MPa) when the honeycomb structure breaks. In the evaluation of the mechanical strength in the present example, a honeycomb structure having an isostatic strength of 1.5 MPa or more is considered acceptable.

TABLE 1

| | Center-side incomplete cells | | | Presence/ absence of communication of incomplete cells inside and outside | Presence/ absence of incomplete cells adjacent in diameter direction | Gradient of arranging direction in center cell structure | Thermal shock resistance (° C.) | Increase of pressure loss after catalyst coating (%) | Mechanical strength (Mpa) |
|---|---|---|---|---|---|---|---|---|---|
| | The number of communicated cells (cells) | Percentage of the number of communicated cells (%) | Presence/ absence of continuous partition wall | | | | | | |
| Example 1 | 9 | 5 | Present | Present | Absent | 45° | 650 | 41 | 3.3 |
| Example 2 | 55 | 32 | Present | Present | Absent | 45° | 700 | 38 | 2.5 |
| Example 3 | 86 | 49 | Present | Present | Absent | 45° | 700 | 36 | 1.5 |
| Example 4 | 88 | 50 | Present | Present | Absent | 45° | 700 | 36 | 1.5 |
| Comp. Ex. 1 | 0 | 0 | Present | Present | Absent | 45° | 600 | 43 | 3.5 |
| Comp. Ex. 2 | 7 | 4 | Present | Present | Absent | 45° | 600 | 43 | 3.3 |
| Comp. Ex. 3 | 90 | 51 | Present | Present | Absent | 45° | 700 | 36 | 1.4 |
| Comp. Ex. 4 | 141 | 80 | Present | Present | Absent | 45° | 700 | 30 | 0.5 |
| Example 5 | 55 | 32 | Absent | Present | Absent | 45° | 650 | 38 | 2.3 |
| Example 6 | 55 | 32 | Present | Absent | Absent | 45° | 650 | 37 | 1.5 |
| Example 7 | 55 | 32 | Present | Present | Present | 45° | 650 | 39 | 1.5 |
| Example 8 | 55 | 32 | Present | Present | Absent | 60° | 700 | 40 | 1.7 |
| Example 9 | 55 | 32 | Present | Present | Absent | 5° | 650 | 41 | 1.5 |
| Example 10 | 55 | 32 | Present | Present | Absent | 10° | 650 | 39 | 1.5 |
| Example 11 | 55 | 32 | Present | Present | Absent | 50° | 650 | 39 | 1.5 |

Examples 2 to 11, Comparative Examples 1 to 4

In a manner similar to that of Example 1 except that the constitution of each of the center-side incomplete cells was changed as shown in Table 1, a honeycomb structure was manufactured. The honeycomb structure thus manufactured was evaluated for "Thermal shock resistance", "Increase of pressure loss after catalyst coating", and "Mechanical strength" in manners similar to those of Example 1, respectively. The results are shown in Table 1.

(Results)

In the evaluation of the thermal shock resistance, the honeycomb structures of Examples 1 to 11 exceeded 650° C., that is, the acceptance standard. On the other hand, those of Comparative Examples 1 and 2 having a percentage (%) of the number of communicated center-side incomplete cells of 0% and 4%, respectively were not acceptable because a limit temperature at which no abnormality was found was 600° C. In evaluation of thermal shock resistance, with an increase in the percentage (%) of the number of communicated center-side incomplete cells, there was an increasing tendency of a limit temperature at which no abnormality was found.

Also in the evaluation of the pressure loss increase percentage after catalyst coating, the honeycomb structures of Examples 1 to 11 satisfied the acceptance standard of 41% or less. On the other hand, those of Comparative Examples 1 and 2 having a percentage (%) of the number of communicated center-side incomplete cells was 0% and 4%, respectively, each had a pressure loss increase percentage after catalyst coating of 43%, thus not satisfying the acceptance standard.

Further, in the evaluation of the mechanical strength, the honeycomb structures of Examples 1 to 11 had an isostatic strength exceeding 1.5 MPa, that is, the acceptance standard. On the other hand, those in Comparative Examples 3 and 4 having a percentage (%) of the number of communicated center-side incomplete cells of 51% and 80%, respectively, had an isostatic strength below 1.5 MPa, the acceptance standard.

INDUSTRIAL APPLICABILITY

The honeycomb structure of the present invention can be used as a catalyst carrier loading a catalyst for purifying an exhaust gas to be emitted from a gasoline engine, diesel engine, or the like or a filter for purifying the exhaust gas.

DESCRIPTION OF REFERENCE NUMERALS

1: partition wall, 2: cell, 2*a*: cell (cell of a center cell structure), 2*b*: cell (cell of a circumferential cell structure), 2*x*: complete cell, 2*y*: incomplete cell (center-side incomplete cell, circumferential-side incomplete cell), 3: circumferential wall, 4: honeycomb structure body, 8: boundary wall, 11: inflow end face, 12: outflow end face, 15: center cell structure, 16: circumferential cell structure, 100, 200: honeycomb structure, 201: partition wall, 202: cell, 202*a*: cell (cell of a center cell structure), 202*b*: cell (cell of a circumferential cell structure), 202*x*: complete cell, 202*y*: incomplete cell, 204: honeycomb structure body, 208: boundary wall.

What is claimed is:

1. A honeycomb structure comprising a pillar-shaped honeycomb structure body having a porous partition wall that defines a plurality of cells extending from an inflow end face to an outflow end face and serving as a through channel of a fluid and a circumferential wall disposed to surround therewith a circumference of the partition wall, wherein:

supposing that in a face orthogonal to an extending direction of the cells of the honeycomb structure body, cells which are the above-described cells and partitioned at all the sides thereof by the partition wall are designated as complete cells;

the honeycomb structure body has, in the face orthogonal to an extending direction of the cells of the honeycomb structure body, a circumferential cell structure, a center cell structure, and a boundary wall disposed at a boundary between the circumferential cell structure and the center cell structure;

the circumferential cell structure includes, as a repeating unit, the complete cells formed in a circumferential portion of the honeycomb structure body;

the center cell structure includes, as a repeating unit, the complete cells formed in a center portion of the honeycomb structure body;

the circumferential cell structure has, at a boundary portion with the center cell structure, incomplete cells including a portion of a shape of the complete cells serving as the repeating unit of the circumferential cell structure;

the center cell structure has, at a boundary portion with the circumferential cell structure, incomplete cells including a portion of a shape of the complete cells serving as the repeating unit of the center cell structure; and 5% or more to 50% or less of the total number of the incomplete cells of the center cell structure are communicated with incomplete cells of the circumferential cell structure.

2. The honeycomb structure according to claim 1, wherein in the face orthogonal to an extending direction of the cells of the honeycomb structure body, the repeating unit of the circumferential cell structure and the repeating unit of the center cell structure are different from each other in shape.

3. The honeycomb structure according to claim 1, wherein in the face orthogonal to an extending direction of the cells of the honeycomb structure body, the incomplete cells of the center cell structure and the incomplete cells of the circumferential cell structure are partitioned by the partition wall which runs continuously.

4. The honeycomb structure according to claim 1, wherein at a position where the incomplete cells of the center cell structure are communicated with the incomplete cells of the circumferential cell structure, one of the incomplete cells of the circumferential cell structure is communicated with one of the incomplete cells of the center cell structure.

5. The honeycomb structure according to claim 1, wherein the incomplete cells of the center cell structure communicated with the incomplete cells of the circumferential cell structure are not present adjacently in the circumferential direction of the boundary portion.

6. The honeycomb structure according to claim 1, wherein in the face orthogonal to an extending direction of the cells of the honeycomb structure body, an arranging direction of the repeating unit of the cells in the center cell structure has an inclination angle of 10° or more to 50° or less relative to an arranging direction of the repeating unit of the cells in the circumferential cell structure.

* * * * *